UNITED STATES PATENT OFFICE.

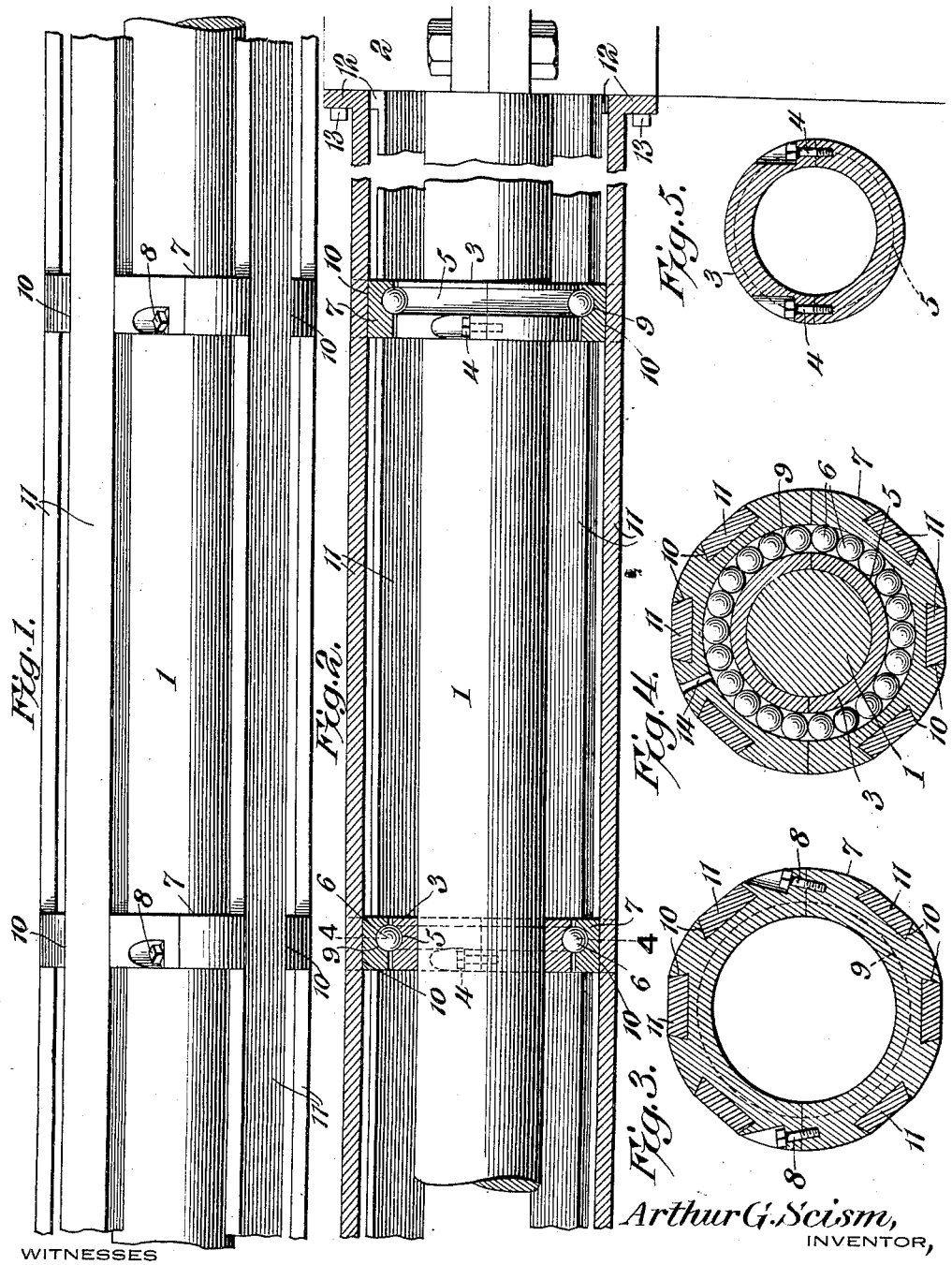

ARTHUR G. SCISM, OF HIGH POINT, NORTH CAROLINA, ASSIGNOR OF ONE-HALF TO JAMES R. COCKS, OF HIGH POINT, NORTH CAROLINA.

SHAFT-GUARD.

1,341,595.   Specification of Letters Patent.   Patented May 25, 1920.

Application filed August 15, 1919. Serial No. 317,769.

*To all whom it may concern:*

Be it known that I, ARTHUR G. SCISM, a citizen of the United States, residing at High Point, in the county of Guilford and State of North Carolina, have invented a new and useful Shaft-Guard, of which the following is a specification.

This invention has reference to shaft guards, and its object is to prevent persons from coming in contact with a revolving shaft where the latter is located in such position as to present a liability of contact therewith with the possibility of danger to the individual.

In accordance with the invention the shaft is inclosed in a cage supported in large measure on the shaft by antifriction bearings, the shaft being exposed to view but protected from contact by a guard extending throughout the length of the shaft where there is any liability of such contact.

The invention will be best understood from a consideration of the following detailed description taken in connection with the accompanying drawing forming part of this specification, with the understanding, however, that the invention is not confined to any strict conformity with the showing of the drawing but may be changed and modified so long as such changes and modifications mark no material departure from the salient features of the invention as expressed in the appended claims.

In the drawing:—

Figure 1 is a side elevation of a portion of a shaft with the guard in place.

Fig. 2 is a side elevation of the shaft showing the guard in diametric section.

Fig. 3 is a cross section of the guard separate from the shaft.

Fig. 4 is a section on the line 4—4 of Fig. 2.

Fig. 5 is a cross section of a ball race applied to the shaft but taken to one side of the ball-receiving portion of the ball race.

Referring to the drawing, there is shown a shaft 1 which may be taken as typical of any appropriate rotatable shaft. It is customary to support power-transmitting shafts in bearings, and so in Fig. 2 there is shown a bearing 2 which may be taken as typical of any appropriate form of bearing.

Fast to the shaft at appropriately spaced points are collars 3, one of which is shown separately in Fig. 5. Each collar is made of two parts so as to be readily applied to an already installed shaft and the two parts are joined by screws or bolts 4, the arrangement being such that the collar tightly grips the shaft when applied so as to rotate with the shaft. The collar is provided with a peripheral groove 5 constituting a ball race and when the parts are in position the race is occupied by a series of antifriction balls 6 which may be taken as typical of any suitable antifriction devices.

Surrounding each collar 3 is another collar 7 which, like the collar 3, is made of two parts for ready application and the two parts of each collar 7 are secured together where meeting by screws or bolts 8. The collar 7 has an interior ball race 9 matching the ball race 5 of the collar 3 and receiving the balls 6. At appropriately spaced points about each collar 7 are recesses 10, which may be undercut recesses and these recesses are alined lengthwise of the shaft so that the alined recesses receive strips 11 which together constitute a cage as long as the portion of the shaft to be protected. The cage is held stationary in any appropriate manner and in Fig. 2 those ends of the strips 11 adjacent to the bearing 2 have out-turned ends 12 held to the bar by screws 13 or in other appropriate manner. The out-turned ends 12 may represent brackets or other forms of fastening means particularly where the strips 11 are formed of wood.

A sufficient number of strips 11 are provided to avoid more than a moderate separation circumferentially of the strips so that while the cage formed by the strips and collars 7 is an open cage, the spaces between the strips are insufficient to permit accidental contact with the shaft by persons in the neighborhood of the shaft.

Each collar 7 has an oil hole 14 by means of which the ball races and balls therein may be lubricated. The oil hole 14 is to be taken as indicative of any means whereby the antifriction bearings may be lubricated.

In installing the shaft guard the collars 3 are applied to the shaft and secured tightly thereon in suitably spaced relation lengthwise of the shaft, then the outer member which may have the strips or slats 11 already in place thereon, is applied about the shaft with the collars 7 encircling the collars 3, one half of each collar 7 being first positioned and the ball race filled with balls 6 and then the other halves of the collars 7 applied with the balls in place, after which the screws 8 are tightened and the screws 13 made fast so that the outer member of the guard is held against rotation. This in no wise interferes with the rotation of the shaft, the guard offering negligible resistance to the rotation of the shaft because of the antifriction bearings. Anyone approaching the shaft may do so without fear of danger because of the guard, while the condition of the shaft is always ascertainable due to the view of the shaft through the spaces between the strips or slats 11. Moreover, the guard being closely associated with and firmly supported by the shaft at different points therealong is proof against springing toward the shaft under pressure, so that under all conditions of use persons liable to contact with the shaft are most effectively protected from such contact.

What is claimed is:—

1. A shaft guard comprising antifriction members each having a part fast to the shaft and another part encircling the first part, and strips carried by the second part in circumferentially spaced relation, said second part being held against rotation and the first part of the antifriction members being made fast to the shaft to rotate therewith.

2. A shaft guard comprising collars fast to the shaft in spaced relation longitudinally thereof and each provided with an exterior ball race, other collars surrounding the first-named collars and provided with interior ball races matching the first-named ball races, and a series of slats carried by the second-named collars and extending from collar to collar and also circumferentially spaced about the second-named collars, to form, together with the second-named collars, a cage encircling the shaft and exposing the latter to view.

3. A shaft guard comprising collars fast to the shaft in spaced relation longitudinally thereof and each provided with an exterior ball race, other collars surrounding the first-named collars and provided with interior ball races matching the first-named ball races, and a series of slats carried by the second-named collars and extending from collar to collar and also circumferentially spaced about the second-named collars, to form, together with the second-named collars, a cage encircling the shaft and exposing the latter to view each collar being split diametrically and provided with means for securing the parts together.

4. A shaft guard comprising collars fast to the shaft in spaced relation longitudinally thereof and each provided with an exterior ball race, other collars surrounding the first-named collars and provided with interior ball races matching the first-named ball races, and a series of slats carried by the second-named collars and extending from collar to collar and also circumferentially spaced about the second-named collars, to form, together with the second-named collars, a cage encircling the shaft and exposing the latter to view, each collar being split diametrically and provided with means for securing the parts together, and the slats having means whereby they may be secured to fixed parts to prevent rotation of the cage with the shaft.

In testimony that I claim the foregoing as my own, I have hereto affixed my signature in the presence of two witnesses.

ARTHUR G. SCISM.

Witnesses:
 THOS. J. GOLD,
 L. M. HOLTON.